No. 709,763. Patented Sept. 23, 1902.
F. GRUMBACHER.
APPARATUS FOR COOLING AND FILTERING COMPRESSED AIR.
(Application filed June 7, 1902.)
(No Model.)
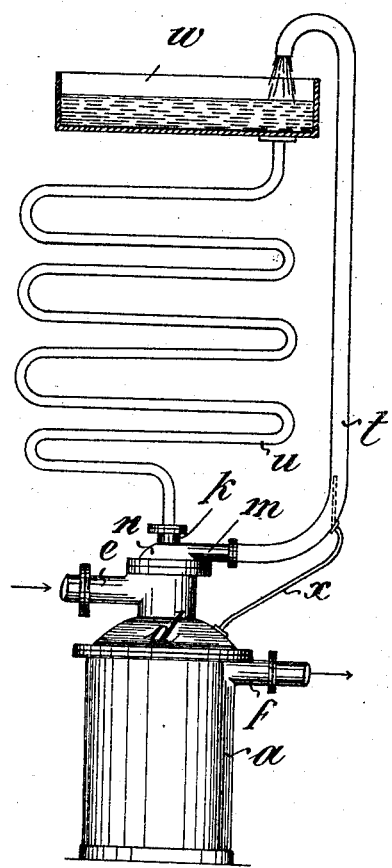
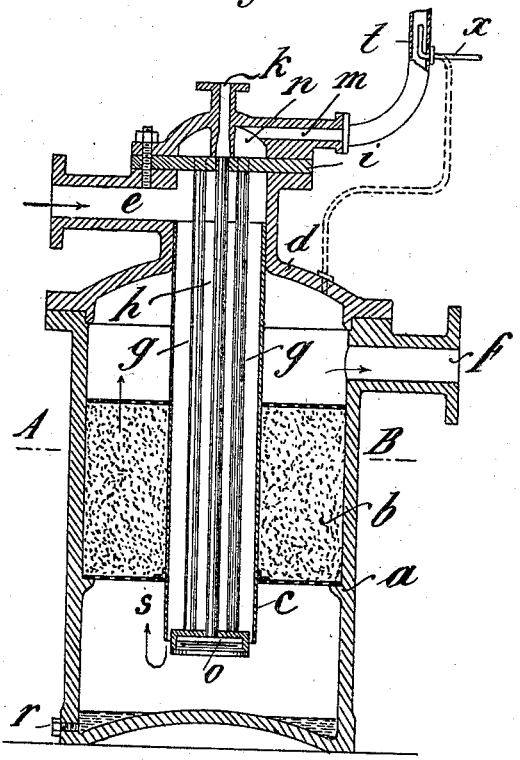
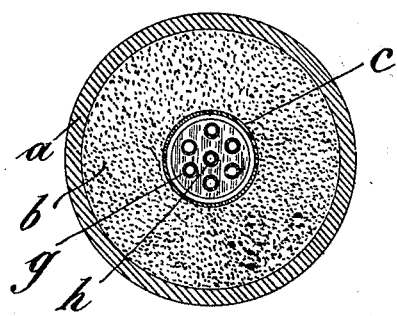

UNITED STATES PATENT OFFICE.

FRIEDRICH GRUMBACHER, OF CHARLOTTENBURG, NEAR BERLIN, GERMANY.

APPARATUS FOR COOLING AND FILTERING COMPRESSED AIR.

SPECIFICATION forming part of Letters Patent No. 709,763, dated September 23, 1902.

Application filed June 7, 1902. Serial No. 110,684. (No model.)

*To all whom it may concern:*

Be it known that I, FRIEDRICH GRUMBACHER, factory manager, a subject of the Emperor of Germany, and a resident of Savigny-Platz 6, Charlottenburg, near Berlin, in the Empire of Germany, have invented certain new and useful Improvements in Apparatus for Cooling and Filtering Compressed Air, of which the following is a specification.

The present invention relates to apparatus for cooling and filtering compressed air, the said apparatus being adapted to be placed in compressed-air conduits leading from compressors and the like.

In the annexed drawings, Figure 1 is an elevation of the apparatus; Fig. 2, a longitudinal section of part thereof on a larger scale, and Fig. 3 a cross-section on the line A B of Fig. 2.

The improved apparatus comprises a chamber $a$, containing a horizontal filtering layer $b$, so supported as to leave spaces above and below it. A pipe $c$, fitting tightly in an orifice in the cover $d$ of chamber $a$, opens through the said cover $d$ and communicates at its upper end with the short pipe $e$, the lower end of the pipe $c$ being open below the filtering layer $b$. Within this pipe $c$ a series of cooling-pipes $g$ $h$ are arranged, the latter being fitted into a plate $i$ above the upper end of the pipe $c$. Upon the said plate $i$ a chamber $n$, with two supply-pipes $k$ and $m$, is secured in such a manner that the pipe $k$ communicates with the central pipe $h$ only and the chamber $n$ with the other pipes. The lower ends of the cooling-pipes $g$ $h$ communicate with a closed chamber $o$ common to them all. If cold water is used for cooling the air, the water enters the apparatus through the pipe $k$ and flows through the pipe $h$ into the lower chamber $o$, from which it passes into the pipes $g$, ascending in the latter until it reaches the chamber $n$ and the outflow-pipe $m$. The air to be cooled and filtered enters the apparatus through the pipe $e$ and passes down through the pipe $c$, being cooled by the walls of the pipes $h$ $g$ on its way. The condensed liquid which may be formed owing to the presence in the air of particles of evaporated oil and water accumulates at the bottom of the chamber $a$ and can be removed from time to time—for instance, through an outlet normally closed by the screw-plug $r$ or the like. The cooled air leaves the pipe $c$, as shown by the arrow $s$, and passes upward through the layer of filtering material to the outlet $f$.

It is obvious that the water for cooling can be made to enter at $m$ instead of at $k$ to flow in the opposite direction and equally so that the air to be cooled can be made to enter the apparatus at $f$ and leave it at $e$.

In order to cool the water which is to be used for cooling purposes, the pipe $u$, Fig. 1, leading from the cistern $w$ to the pipe $k$, may be given a serpentine shape, as shown in Fig 1, and exposed to the open air. To obtain the vigorous circulation of the cooling liquid, compressed air may be supplied, for instance, through a pipe $x$ to the pipe $t$, which forms the continuation of the pipe $m$, so that the air-bubbles formed in the ascending water reduce the specific gravity of the latter and cause a vigorous upward flow. The air-supply pipe $x$ may be connected to a compressed-air drum or the like, or, as shown by dotted lines in Fig. 2 and by full lines in Fig. 1, directly to the chamber $a$.

Having thus described my invention, the following is what I claim as new therein and desire to secure by Letters Patent:

1. An apparatus for cooling and filtering air comprising a filtering-chamber the filtering layer of which is penetrated by a central pipe, the upper end of the latter fitting tightly into the cover of the filtering-chamber and connected to a supply-pipe, and the lower end of the said central pipe being open, in combination with a system of cooling-pipes arranged within the central pipe and provided at one end with a closed common chamber and connected at the other end respectively with a collecting-chamber and supply-pipe, essentially as and for the purpose set forth.

2. An apparatus for cooling and filtering air comprising a filtering-chamber the filtering layer of which is penetrated by a central pipe, the upper end of the latter fitting tightly into the cover of the filtering-chamber and connected to a supply-pipe, and the lower end of the said central pipe being open, a system of cooling-pipes arranged within the central pipe and provided at one end with a closed common chamber and connected at the other end respectively with a collecting-chamber and supply-pipe, in combination with a supply-cistern and a serpentine pipe from the said cistern to the supply-pipe of the cooling-pipe system essentially as and for the purpose set forth.

3. An apparatus for cooling and filtering air comprising a filtering-chamber the filtering layer of which is penetrated by a central pipe, the upper end of the latter fitting tightly into the cover of the filtering-chamber and connected to a supply-pipe, and the lower end of the said central pipe being open, a system of cooling-pipes arranged within the central pipe and provided at one end with a closed common chamber and connected at the other end respectively with a collecting-chamber and supply-pipe, in combination with a supply-cistern, a serpentine pipe from the said cistern to the supply-pipe of the cooling-pipe system, and a rising pipe connected to the collecting-chamber of the cooling-pipe system and leading to the said supply-cistern, and a pipe for compressed air leading into the said rising pipe in order that the compressed air supplied to the pipe should give upward motion to the water coming from the cooling-pipes, essentially as and for the purpose set forth.

In witness whereof I have hereunto set my hand in presence of two witnesses.

FRIEDRICH GRUMBACHER.

Witnesses:
   WOLDEMAR HAUPT,
   HENRY HASPER.